United States Patent
Kessler et al.

(10) Patent No.: US 11,946,183 B2
(45) Date of Patent: Apr. 2, 2024

(54) METHOD FOR DETERMINING TREATMENT PARAMETERS VIA AN INFORMATION CARRIER

(71) Applicant: Henkel AG & Co. KGaA, Duesseldorf (DE)

(72) Inventors: Arnd Kessler, Monheim am Rhein (DE); Christian Nitsch, Duesseldorf (DE); Lars Zuechner, Langenfeld (DE); Georg Wawer, Vienna (AT); Alexander Mueller, Monheim (DE); Clemens Arth, Graz (AT)

(73) Assignee: HENKEL AG & CO. KGAA, Duesseldorf, NY (US)

( * ) Notice: Subject to any disclaimer, the term of this patent is extended or adjusted under 35 U.S.C. 154(b) by 357 days.

(21) Appl. No.: 16/465,452

(22) PCT Filed: Dec. 7, 2017

(86) PCT No.: PCT/EP2017/081854
§ 371 (c)(1),
(2) Date: May 30, 2019

(87) PCT Pub. No.: WO2018/114361
PCT Pub. Date: Jun. 28, 2018

(65) Prior Publication Data
US 2020/0002874 A1    Jan. 2, 2020

(30) Foreign Application Priority Data

Dec. 21, 2016  (DE) ..................... 10 2016 225 823.0

(51) Int. Cl.
*D06F 33/30*    (2020.01)
*D06F 34/18*    (2020.01)
(Continued)

(52) U.S. Cl.
CPC ........... *D06F 34/18* (2020.02); *G06K 7/1417* (2013.01); *G06K 7/1447* (2013.01); *D06F 33/30* (2020.02);
(Continued)

(58) Field of Classification Search
None
See application file for complete search history.

(56) References Cited

U.S. PATENT DOCUMENTS 9,534,332 B2   1/2017 Gasparini et al.
2010/0186460 A1   7/2010 Boeldt et al.
(Continued)

FOREIGN PATENT DOCUMENTS

CN   102762790 A   10/2012
CN   103820971 B   5/2014
(Continued)

OTHER PUBLICATIONS

Espacenet translation of WO 2009/09499 A2, Washer or dishwasher comprising a data acquisition unit (Year: 2009).*
(Continued)

*Primary Examiner* — Cristi J Tate-Sims
(74) *Attorney, Agent, or Firm* — Lorenz & Kopf, LLP

(57) ABSTRACT

A method performed by one or more devices includes determining an information item indicative of at least one parameter affecting the treatment of a textile with the information item being detected by an information carrier of the textile (220) and/or a cleaning device (230), or a cleaning agent (210) and the textile (220), or the cleaning agent (210) and the cleaning device, or the cleaning agent (210) and the textile (220) and the cleaning device and the information carrier comprises a package, a label, an NFC chip or a combination thereof, determining at least one treatment parameter of the textile based at least in part on the deter-
(Continued)

mined information item, and outputting or triggering the outputting of the at least one determined treatment parameter.

15 Claims, 4 Drawing Sheets

(51) Int. Cl.
    *G06K 7/14*         (2006.01)
    *D06F 34/20*       (2020.01)
    *D06F 103/00*     (2020.01)
    *D06F 103/06*     (2020.01)
    *D06F 103/16*     (2020.01)
    *D06F 103/22*     (2020.01)
    *D06F 103/38*     (2020.01)
    *D06F 105/58*     (2020.01)

(52) U.S. Cl.
    CPC .......... *D06F 34/20* (2020.02); *D06F 2103/00* (2020.02); *D06F 2103/06* (2020.02); *D06F 2103/16* (2020.02); *D06F 2103/22* (2020.02); *D06F 2103/38* (2020.02); *D06F 2105/58* (2020.02)

(56) References Cited

U.S. PATENT DOCUMENTS

| | | | | |
|---|---|---|---|---|
| 2013/0239337 | A1* | 9/2013 | Kim | D06F 33/36 68/12.02 |
| 2014/0157526 | A1 | 6/2014 | Larmo et al. | |
| 2014/0236328 | A1* | 8/2014 | Kamon | D06F 33/37 700/90 |
| 2016/0215430 | A1* | 7/2016 | Ha | D06F 33/37 |
| 2016/0234035 | A1* | 8/2016 | Boeldt | H04W 12/50 |
| 2016/0300350 | A1 | 10/2016 | Choa et al. | |
| 2018/0165486 | A1* | 6/2018 | Bajovic | G06K 7/1413 |
| 2018/0165744 | A1* | 6/2018 | Bajovic | G06Q 30/0631 |
| 2018/0360285 | A1* | 12/2018 | Erkek | A47L 9/2894 |

FOREIGN PATENT DOCUMENTS

| | | |
|---|---|---|
| CN | 104619902 A | 5/2015 |
| CN | 105603678 A | 5/2016 |
| CN | 106192306 A | 12/2016 |
| DE | 19747150 A1 | 4/1999 |
| DE | 202008001532 U1 | 4/2008 |
| DE | 102008005363 A1 | 10/2008 |
| DE | 102008036943 A1 | 8/2009 |
| DE | 102012101537 A1 | 8/2013 |
| EP | 2757187 A1 | 7/2014 |
| JP | 2008287348 A | 11/2008 |
| JP | 2014030575 A | 2/2014 |
| JP | 2016131581 A | 7/2016 |
| KR | 20010077081 A | 8/2001 |
| KR | 20080060806 A | 7/2008 |
| KR | 20130020375 A | 2/2013 |
| KR | 20150031429 A | 3/2015 |
| KR | 20150075464 A | 7/2015 |
| KR | 101631542 B1 | 6/2016 |

OTHER PUBLICATIONS

Wikipedia Barcode reader (Year: 2021).*
Espacenet translation WO 2009/094999 A2, Weber, The washer or dishwasher comprising a data acquisition unit (Year: 2009).*
EPO, International Search Report and Written Opinion issued in International Application No. PCT/EP2017/081854, dated Feb. 1, 2018.

* cited by examiner

METHOD FOR DETERMINING TREATMENT PARAMETERS VIA AN INFORMATION CARRIER

CROSS-REFERENCE TO RELATED APPLICATION

This application is a U.S. National-Stage entry under 35 U.S.C. § 371 based on International Application No. PCT/EP2017/081854, filed Dec. 7, 2017, which was published under PCT Article 21(2) and which claims priority to German Application No. 10 2016 225 823.0, filed Dec. 21, 2016, which are all hereby incorporated in their entirety by reference.

TECHNICAL FIELD

The present disclosure relates to methods and devices with which at least one treatment parameter is determined at least partially based on an information item by determining the information item indicative of at least one parameter affecting the treatment of textiles.

BACKGROUND

Textiles must undergo a regular cleaning treatment when in use. The user usually manually selects a particular type of treatment with appropriate treatment parameters. Treatment parameters can in this case be, in particular, the type of cleaning agent, cleaning temperature, duration of cleaning, dosing of cleaning agent, or the cleaning program to be performed.

The identification of the type of treatment of the textile is usually made by a user. Treatment parameters that are optimal for treatment are often determined according to the user's experience and based on markings on the textiles, for example, via textile care marks on a label attached to the textile, according to their color, and according to the type of cleaning agent available to the user.

Textiles here include, in particular, garments, curtains or bedding. Garments and bedding include, for example, shirts, T-shirts, dresses, jackets, sweaters, pants, blankets, slips, and covers. The textiles can comprise various materials, for example, natural fibers, chemical fibers or other materials such as leather.

However, the selection of the treatment of the textile by the user can lead anywhere from suboptimal results to incorrect treatments. For example, textiles can be subjected to inappropriate cleaning treatments, which in particular can lead to an increased consumption of resources such as cleaning agents and water, but also to an insufficient cleaning performance of the textile. Furthermore, an incorrectly set treatment parameter on the part of the user, in particular a temperature selected too high, can damage the textile or even lead to a destruction of the textile.

SUMMARY

Against the background of the state of the art presented, it is thus the object of the present disclosure to at least partially reduce or avoid the problems described, that is, to simplify the treatment of a textile, in particular with regard to a washing method of the textile on the one hand and, and on the other hand, to better adapt to individual circumstances, so that an optimized treatment of the textile is possible.

According to a first aspect of the present disclosure, a method performed by one or more devices is described, the method comprising: determining an information item indicative of at least one parameter affecting the treatment of a textile, wherein the information item is detected by an information carrier of a cleaning agent, the textile and/or a cleaning device and the information carrier comprises a package, a label, an NFC chip, or a combination thereof; determining at least one treatment parameter of the textile based at least in part on the determined information item; and outputting or triggering the outputting of the at least one determined treatment parameter.

According to a second aspect, a device is described which is configured as or comprises corresponding features for performing and/or controlling a method according to the first aspect. Devices of the method according to the first aspect are or comprise in particular one or more devices according to the second aspect.

An information item indicative of at least one parameter affecting the treatment of a textile is determined. The information item is detected by an information carrier of a cleaning agent, the textile and/or a cleaning device. Thus, both the respective alternatives and any possible combination of the detection of the information item to be determined by an information carrier are included. The information item can be detected, for example, by an information carrier of a cleaning agent. Additionally or alternatively, the information item can be detected by an information carrier of the textile. In addition, the information item can be detected by an information carrier of a cleaning device. The information item can thus be detected separately by an information carrier of a cleaning agent, the textile or a cleaning device. Furthermore, the information item can each be detected by an information carrier of a cleaning agent and the textile, or a cleaning agent and a cleaning device, or the textile and a cleaning device, or a cleaning agent and the textile and a cleaning device.

The information carrier comprises a package, a label, an NFC chip or a combination thereof. Furthermore, the information carrier can be provided by a package, a label, an NFC chip or a combination thereof. An NFC chip (NFC: Near Field Communication), for example, an RFID transponder (RFID: Radio Frequency Identification), also referred to as radio tag. Information items that can be read can be stored on the NFC chip. For example, in the case where an NFC chip is attached on a package of a cleaning agent, the NFC chip can store the information item exemplifying this cleaning agent, such as the composition and/or durability of the cleaning agent. Furthermore, a unique identifier can be stored on the NFC chip. The unique identifier can, for example, make it possible to draw conclusions about the information item exemplifying the cleaning agent.

If the information carrier is a package, the package can have the information item which is indicative of at least one parameter affecting the treatment of a textile in the form of characters. Alternatively or additionally, the package can have the information item in the form of a bar code, for example, a dash bar code or a two-dimensional bar code, wherein the bar code is printed, for example, on the package. Furthermore, the package can alternatively or additionally comprise an NFC chip on which the information item is stored and from which, for example, the information item can be read by employing a suitable NFC reading device.

If the information carrier is a label, the label can have the information item which is indicative of at least one parameter affecting the treatment of a textile in the form of characters. Alternatively or additionally, the label can have the information item in the form of a bar code, for example, a bar code or a two-dimensional bar code, wherein the bar code is printed on the label, for example. Furthermore, the label can alternatively or additionally comprise an NFC chip on which the information item is stored and from which, for example, the information item can be read by employing a suitable NFC reading device.

***The at least one treatment parameter is output or causes its output. For example, the at least one treatment parameter is displayed to a user on a display device, so that the user is provided, for example, with a recommendation about an optimum treatment of the textile, in particular visually and/or acoustically. The user can then perform the treatment in accordance with the at least one treatment parameter displayed on the display device. For example, the user can also be provided with a plurality of sets of treatment parameters (for example, by a display on a display device), such as treatment parameters for particularly gentle, for particularly intensive and/or for particularly energy-saving treatments of the textile.

Alternatively or additionally, at least one treatment parameter can be transmitted to a cleaning device, so that a performance of a treatment of the textile is triggered as an action. This action can, for example, drive a cleaning device, such as a washing machine. For this purpose, for example, the determined at least one treatment parameter can be transmitted to the cleaning device by employing a correspondingly configured communication device, for example, by employing a wired or a wireless communication connection. The wireless communication connection can be formed according to the Bluetooth or the WLAN standard, for example. For example, the at least one treatment parameter can be transferred to a cleaning device, which adopts the corresponding treatment parameters as a default and wherein the user only has to start the cleaning device. It is also conceivable that the cleaning device automatically performs the cleaning treatment with the output of the at least one treatment parameter. For example, the cleaning device can have a dosing device for cleaning agent to automatically provide the cleaning agent type and cleaning agent dosage according to the recommended treatment based on the at least one treatment parameter. As a result, in addition to the user-friendliness of the method, the consumption of resources, such as the cleaning agent used to treat the textile, is also improved.

In a next embodiment of the method according to the first aspect, at least one optical sensor element and/or one NFC reading device is used to determine the information item. Accordingly, the device according to the second aspect can have an optical sensor element and/or an NFC reading device.

In this case, an optical sensor is understood as meaning a sensor which can determine an intensity of incident radiation, in particular electromagnetic radiation in the visible range and optionally beyond. The optical sensor can comprise an image sensor, in particular a digital image sensor. In particular, at least one semiconductor element, diode, CCD element, for example a Bayer sensor, or CMOS element can be used to determine the incident radiation. The optical sensor can contain and/or comprise an optical filter, and in particular a spectrometer.

Also conceivable is the use of monochrome sensors without color resolution. Sensors can also be used which are limited to certain wavelength ranges, for example, based on at least one photodiode and/or at least one LED element.

In one embodiment, the at least one optical sensor element comprises at least one camera-like element and provides an image information item from the information carrier. Accordingly, digital cameras or cameras integrated into mobile devices can be used for the method or serve as at least one device for performing the method.

An NFC reading device in this case is understood as meaning a device which can be used for reading out an information item which can be stored on an NFC chip. The NFC reading device can generate alternating magnetic fields or high-frequency radio waves for reading out an information item of the NFC chip. The NFC chip is exposed to these alternating fields or the high-frequency radio waves, wherein the NFC chip, for example, receives the alternating field or the high-frequency radio waves in the form of high-frequency energy via an integrated antenna. This high-frequency energy can use the NFC chip as a power supply for the NFC chip. Thus, the NFC chip is activated so that a communication between the NFC chip and the NFC reader can be performed.

According to one embodiment of the method according to the first aspect, the image information item is processed by employing a character recognition to determine at least one treatment parameter of the textile. For this purpose, in an embodiment according to the first aspect, the method can further comprise subjecting the determined information item to a processing algorithm.

In particular, an evaluation of characters, which is comprised by the information carrier, can be performed for the determination of the at least one treatment parameter or for the analysis of the image information item. For example, a so-called OCR method (OCR: Optical Character Recognition) can be used. For example, an image information item is detected with the camera-like element of the at least one optical sensor element. A digital representation of transcribed information item is obtained from the image information item. The image information item can, for example, represent the package or a content description depicted on the package. At least one information item, such as, for example the durability and/or the composition of the cleaning agent, is read from the (digital) image information item by employing the OCR method.

In a further embodiment, the image information item is processed by employing a bar code recognition in order to determine at least one treatment parameter of the textile. Accordingly, the device according to the second aspect can have an optical sensor element and/or an NFC reading device.

The bar code can be imaged, for example, on the information carrier, in particular on a package or on a label, which can each be comprised by the information carrier. For example, a bar code or a two-dimensional bar code can be used as a bar code. A bar code of parallel bars of different widths, whereby the bars of the bar code represent binary symbols. Accordingly, a reading of the bar code, for example, can result in an information item. For example, the information item can be determined by comparing this information item with information items stored in a database. For example, the bar code is indicative of a unique identifier. Information items about, for example, a composition and a durability of a cleaning agent are stored in the database for this identifier. If the bar code is detected by an information carrier of a textile, the bar code can be indicative of a surface property, color of the textile, or a combination thereof.

For example, a two-dimensional bar code can also be used as a bar code. Two-dimensional bar codes encode at least one information item in an area in the form of white and black squares. Unlike the bar code, the two-dimensional bar code comprises binary symbols in two dimensions, allowing for a higher density of information items comprised in the two-dimensional bar code. The statements made previously in connection with a bar code also apply analogously to two-dimensional bar codes.

In a further embodiment according to the first aspect, the NFC reading device is operated according to the NFC standard.

A further embodiment according to the first aspect provides that the information item is indicative of a composition of a cleaning agent, a durability of a cleaning agent or a combination thereof.

Cleaning agents are used, for example, in the household for the cleaning of different objects. For example, a cleaning agent, for example, a washing agent, for washing machines is used for cleaning textiles. However, a cleaning agent should likewise also be understood as meaning cleaning auxiliaries or cleaning additives, for example, a bleaching additive, a fabric softener or laundry starch. A cleaning agent can also be a liquid, a dispersed system, for example, a gel or foam, or a solid, in particular, a tab, powder or granules.

A cleaning agent can, for example, have one or more components from the group of components comprising surfactants, alkalis, builders, grayness inhibitors, optical brighteners, enzymes, bleach, soil release polymers, fillers, plasticizers, perfumes, dyes, conditioners, acids, starch, isomalt, sugar, cellulose, cellulose derivatives, carboxymethylcellulose, polyetherimide, silicone derivatives and/or polymethylimines.

A cleaning agent can further comprise one or more other ingredients. These ingredients include, but are not limited to, the group of bleach activators, chelants, builders, electrolytes, nonaqueous solvents, pH adjusters, perfume carriers, fluorescers, hydrotropes, silicone oils, bentonites, anti redeposition agents, anti-wear agents, anti-wrinkle agents, dye transfer inhibitors, anti-microbial active substances, germicides, fungicides, antioxidants, preservatives, corrosion inhibitors, anti-static agents, bittering agents, ironing auxiliaries, repellents or impregnating agents, swelling or slipping agents and/or UV absorbers.

The determined information item can represent the composition of a cleaning agent and thus be indicative of the composition of a recommended cleaning agent. For example, if it is recognized on the basis of the composition of the cleaning agent that it is a gentle cleaning agent, the user can be advised to use this cleaning agent, for example, for a textile that contains some wool or corresponding wool applications on the textile. If, for example, in addition to the composition of the cleaning agent, the determined information item is indicative of a shelf life of the cleaning agent, it can be correspondingly evaluated whether the properties of the cleaning agent associated with the composition of the cleaning agent, for example, gentle cleaning agent, can realize these properties. For example, if the shelf life of the cleaning agent has expired, the user can be advised to refrain from using the cleaning agent.

A further embodiment according to the first aspect provides that the determined information item is indicative of a surface property of the textile.

A surface property of the textile is understood as meaning, among other things, its type of material and/or the material structure of the textile.

The material structure of the textile is understood in particular as meaning the type and/or shape of a woven textile, a knit textile or nonwoven textile or batt. The corresponding surface property can in particular be characteristic of the type of interweaving of fibers, as produced, for example, via weaving, knitting, or characteristic of a nonwoven textile. In this case, a splice pattern and a thread cross-over pattern and a thread weave can be included in the surface property. Yarn density, fiber thickness, fiber length, fiber fineness and/or fiber orientation can be detected in particular in the determined information item by an information carrier of the textile. The textile structure of the textile has a direct effect on the requirements for the treatment of the textile, for example, a knitwear made of wool can have different requirements for a cleaning treatment than a nonwoven textile.

The type of material is understood in particular as meaning the composition of at least part of the material of the textile. For example, the surface property of the textile is indicative of natural fibers, chemical fibers or natural materials such as wool or leather in the textile. The type of material also has a significant effect on an optimal treatment of the textile, such as a cleaning treatment.

For example, when a surface property of the textile that is characteristic of a wool knit textile is recognized based on the determined information item, after appropriately determining at least one treatment parameter of the textile based on this information item, the user can be advised to use a gentle cleaning agent.

If, in addition, it is additionally recognized on the basis of the determined information item that the composition of the cleaning agent indicates a gentle cleaning agent, the use of the present cleaning agent for a cleaning treatment of the present textile can be recommended to the user. If it can be deduced from the determined information item that the composition of the cleaning agent is not suitable for the cleaning treatment of textiles to be protected, the user can not be advised to use the present cleaning agent to treat the present textile.

A further embodiment according to the first aspect provides that the determined information item is indicative of a type of cleaning device.

A cleaning device is understood in particular as meaning a washing machine, in particular an automatic household washing machine. Here, the determined information item can indicate a type of such a cleaning device. The determined information item that is detected in particular by an information carrier of a cleaning device, can include settings of the cleaning device, such as a program of a automatic household washing machine or a sequence of such programs. The respective duration of a program or of a sequence of such programs can likewise be comprised by the information item that can be detected by an information carrier of a cleaning device.

An embodiment according to the first aspect provides that the at least one treatment parameter is indicative of a recommendation or effect on a type of cleaning agent, cleaning temperature, duration of cleaning, dosing of cleaning agent, a time for using the cleaning agent, a cleaning program or a combination thereof.

The at least one treatment parameter can represent the type of cleaning agent, in particular, indicate a composition of a cleaning agent which can be recommended to a user based on the determined information item.

The at least one treatment parameter can represent the cleaning temperature. In particular, the cleaning temperature can be detected by an information carrier of a textile. Accordingly, the at least one treatment parameter can represent a cleaning temperature selected during the treatment of the textile and ensures that no damage can occur in the context of the treatment to the textile due to a faulty selected temperature. An optimum temperature for cleaning the textile can be specified using a treatment parameter representative of the cleaning temperature. In particular in combination with a type of cleaning agent, an especially optimized treatment of the textile can take place with regard to protection of the textile, optimized cleaning result and conservation of resource consumption, such as amount of cleaning agent and water. On the one hand, the cleaning temperature can be high enough to ensure that the textile is cleaned as completely as possible and, on the other hand, kept low in terms of energy consumption and protection of the textile.

The at least one treatment parameter can represent the duration of the cleaning, in particular in combination with a type of cleaning agent and a cleaning temperature. On the one hand, the cleaning time can be long enough to allow for as complete a cleaning as possible, and on the other hand, it can be selected short in order to minimize the burden on the textile due a long cleaning time during the treatment.

The at least one treatment parameter can represent the cleaning agent dosage and, in particular, indicate an absolute amount of the cleaning agent. Likewise, a relative amount of the cleaning agent can be displayed by the at least one treatment parameter, for example, based on a volume of water to be used for cleaning.

The at least one treatment parameter can represent the time of application of the cleaning agent, for example, whether the cleaning agent is added before, during or after a washing cycle of a cleaning program, for example, performed by a cleaning device. In particular, in this case, optimal treatment, for example, as complete as possible cleaning of the textile, can be achieved in combination of one or more of the recommendations or effects (i) type of cleaning agent, (ii) cleaning temperature, (iii) cleaning time, (iv) dosing of cleaning agent.

The at least one treatment parameter can represent a cleaning program, in particular with regard to a determined information item that has been detected by an information carrier of a cleaning device. If the available cleaning programs of a cleaning device are known, the program correspondingly can be recommended to the user or a cleaning device for selecting the cleaning program can be affected directly, which enables the best possible cleaning result on the basis of the particular at least one treatment parameter. If, for example, an information item is determined by an information carrier of a cleaning device, and additionally an information item by an information carrier of a cleaning agent, from that combination, for example, the composition and durability of the cleaning agent and the available cleaning programs of the cleaning device, at least one treatment parameter based on this combination can be optimally determined, that is, for example, as complete as possible cleaning result of the textile is enabled. If, in addition, an information item is determined which has been detected by an information carrier of the textile, this determined information item can also be taken into account for the recommendation to the user or effect of a cleaning device for performing the treatment of a textile. For example, the textile can be a textile that is to be protected, so that a short duration is selected as the cleaning program. For example, if it is a textile that has a robust material structure, a cleaning program of long duration can be selected. These two above examples are based on the assumption that the same cleaning agent is to be used for treating the textile on the basis of the determined information item.

In a further embodiment, the method further comprises: performing or causing the performance of a treatment of the textile according to the at least one determined treatment parameters by employing a cleaning device.

In a further embodiment of the method according to the first aspect, the information item is determined before, during and/or after a treatment of the textile. When determining the information item before or during the treatment of the textile, the treatment can be performed dynamically, for example, a cleaning device can adapt to the textile currently being treated during the treatment, in particular by continuously determining treatment parameters.

In a further embodiment of the method, at least one of the devices for performing the method is a mobile device and/or a module comprised by a cleaning device. In particular, a communication can be performed via a communication system between a mobile device, for example, a smart phone, laptop, tablet, wearable or a camera, and at least one further device, for example, a cleaning device. In an alternative embodiment of the method, at least one of the devices for performing the method is arranged on a cleaning device or comprises a cleaning device. Accordingly, an already existing cleaning device can be retrofitted with at least one device for performing the method. Furthermore, a cleaning device can comprise at least one device for performing the method. For example, such a device can be implemented in a cleaning device. For example, an installation of such a device in a dispensing chamber of a cleaning device is conceivable. In order to determine the information item, the cleaning device can accordingly be equipped with at least one optical sensor element and/or one NFC reading device. For example, the at least one optical sensor element and/or the NFC reading device can be integrated into a front panel of the cleaning device.

According to one embodiment, the device according to the second aspect comprises a communication interface. For example, the communication interface is configured for wired or wireless communication. For example, the communication interface is a network interface. The communication interface is preferably configured to communicate with a communication system. Examples of a communication system are a local area network (LAN), a wide area network (WAN), a wireless network (for example, according to the IEEE 802.11 standard, the Bluetooth (LE) standard and/or the NFC standard), a wired network, a mobile network, a telephone network and/or the Internet. A communication system can comprise communication with an external computer, for example, via an Internet connection.

In one embodiment of the method, the determination of the at least one treatment parameter comprises a comparison of the determined information item with comparison values. Corresponding comparison values can be stored in a database. The determined information item can be subjected to a classification, wherein the at least one treatment parameter is obtained or affected by a result of the classification. For example, a classification can be based on a comparison of the determined information item with a database of already known information items. Furthermore, determined treatment parameters can be assigned to the corresponding comparison values.

The evaluation of the determined information item or the determination of the at least one treatment parameter can in this case be performed with the device which has the at least one optical sensor element and/or the NFC reading device. For example, the at least one optical sensor element and/or the NFC reading device is arranged or integrated on a mobile device or on a cleaning device. The same device can also have an evaluation unit which performs or causes the determination of the at least one treatment parameter.

Likewise, the evaluation of the information item or the determination of the at least one treatment parameter can be performed by a further device, which, in particular, communicates with the device which has the structure sensor via a communication system. A server can be provided for this purpose which executes the evaluation or causes further devices to perform the evaluation. Such a server is, for example, a database server. Examples of a database server include Microsoft SQL Server, Oracle Server, and MySQL Server. For example, the servers can be part of a so-called computer cloud that provides data processing resources dynamically to various users in a communication system. A computer cloud is understood, in particular, as meaning a data processing infrastructure as defined by the National Institute for Standards and Technology (NIST) for the English term "cloud computing". An example of a computer cloud is a Microsoft Windows Azure Platform.

According to the second aspect of the present disclosure, an alternative device is also described, comprising at least one processor and at least one memory having computer program code, wherein the at least one memory and the computer program code are configured to execute and/or to control at least one method according to the first aspect with the at least one processor. For example, a processor is understood as meaning a control unit, a microprocessor, a microcontrol unit such as a microcontroller, a digital signal processor (DSP), an application specific integrated circuit (ASIC), or a field programmable gate array (FPGA).

For example, an exemplary device further comprises features for storing information such as a program memory and/or a main memory. For example, an exemplary device as contemplated herein further comprises features for receiving and/or sending information over a network, such as a network interface. For example, exemplary devices as contemplated herein are connected to each other and/or connectable to each other via one or more networks.

An exemplary device according to the second aspect is or comprises, for example, a data processing system that is configured in terms of software and/or hardware in order to be able to execute the respective steps of an exemplary method according to the first aspect. Examples of a data processing system include a computer, a desktop computer, a server, a thin client and/or a portable computer (mobile device), such as a laptop computer, a tablet computer, a wearable, a personal digital assistant or a smart phone.

According to the second aspect of the present disclosure, there is also described a computer program comprising program instructions that cause a processor to execute and/or control a method according to the first aspect when the computer program is run on the processor. An exemplary program as contemplated herein can be stored in or on a computer-readable storage medium containing one or more programs.

According to the second aspect of the present disclosure, there is also described a computer-readable storage medium containing a computer program according to the second aspect. A computer-readable storage medium can be formed, for example, as a magnetic, electrical, electro-magnetic, optical and/or other type of storage medium. Such a computer-readable storage medium is preferably graphical (that is, "touchable"), for example, it is formed as a data carrier device. Such a data carrier device is for example, portable or permanently installed in a device. Examples of such a data carrier device are volatile or non-volatile random access memory (RAM) such as NOR flash memory or having sequential access such as NAND flash memory and/or read-only access memory (ROM) or read-write access. For example, computer readable is to be understood as meaning that the storage medium can be read and/or written by a computer or a data processing system, for example, by a processor.

A third aspect of the present disclosure also describes a system comprising a plurality of devices, in particular a mobile device according to the first aspect or a module that can be arranged in a cleaning device according to the first aspect or a module integrated into a cleaning device according to the first aspect and a cleaning device, which together perform a method according to the first aspect.

An exemplary system according to the third aspect comprises an exemplary cleaning device and additionally a further device, for example, a module arranged in a cleaning device or a module integrated into a cleaning device or a server for performing an exemplary method according to the first aspect.

In particular, the system according to the third aspect can also further comprise at least one textile or a set of textiles. Furthermore, the system according to the third aspect can additionally or alternatively comprise a cleaning agent.

The exemplary embodiments of the present disclosure described above in this description are also to be understood as being disclosed in all combinations with one another. In particular, exemplary embodiments are to be understood in terms of the different aspects disclosed.

In particular, the preceding or following description of method steps according to preferred embodiments of a method also discloses corresponding features for performing the method steps by preferred embodiments of a device. Likewise, the disclosure of a device for performing a method step is intended to also disclose the corresponding method step.

BRIEF DESCRIPTION OF THE DRAWINGS

Further advantageous exemplary embodiments of the present disclosure can be found in the following detailed description of some exemplary embodiments of the present disclosure, in particular, in conjunction with the figures. However, the figures should only serve the purpose of clarification, but not to determine the scope of the present disclosure. The figures are not to scale and are merely intended to reflect the general concept of the present disclosure. In particular, features included in the figures should by no means be considered as a necessary component of the present disclosure.

Accordingly, the present disclosure will hereinafter be described in conjunction with the following drawing figures, wherein like numerals denote like elements, and.

DETAILED DESCRIPTION

The following detailed description is merely exemplary in nature and is not intended to limit the disclosure or the application and uses of the subject matter as described herein. Furthermore, there is no intention to be bound by any theory presented in the preceding background or the following detailed description.

Figure 1:
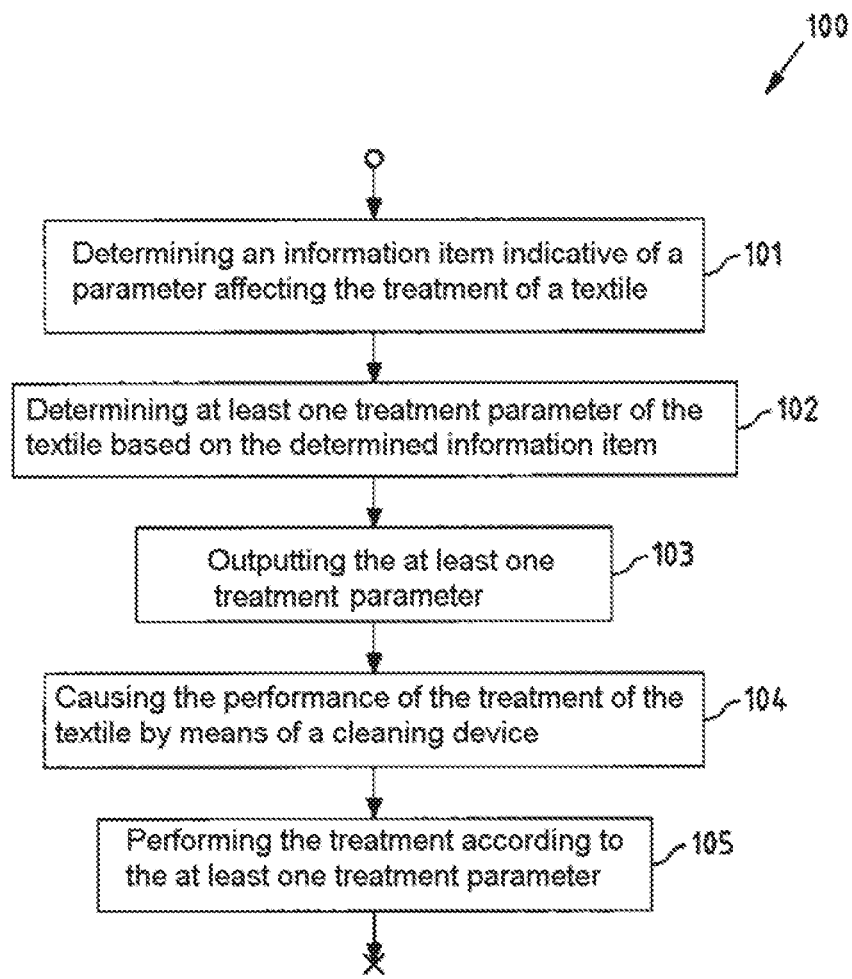
FIG. 1 is a flowchart of an embodiment of a method.
Figure 2A:
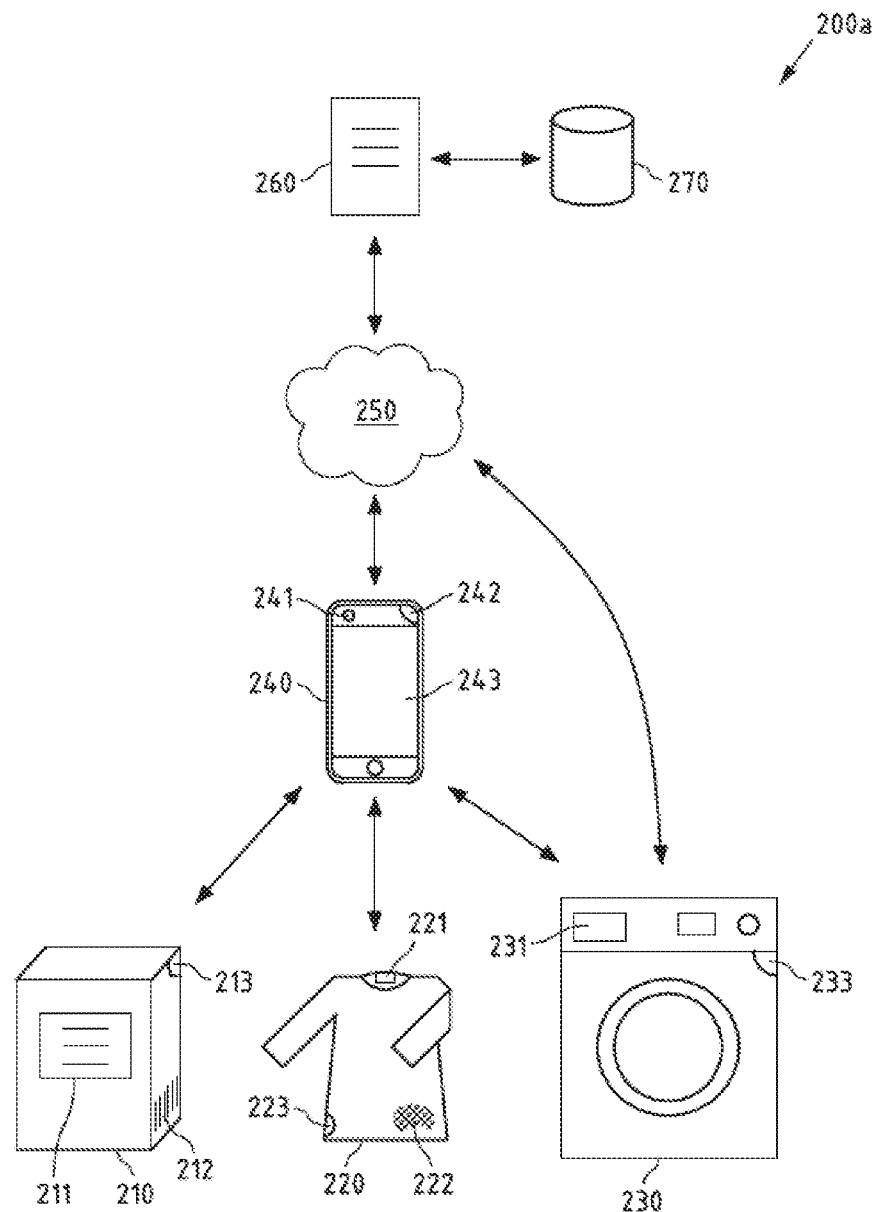
FIG. 2*a* is a schematic representation of an embodiment of a system.

FIG. 1 shows a flowchart 100 of a further embodiment of a method according to the first aspect, which can be performed by a device, for example, device 240 of FIG. 2*a*.

An information item indicative of at least one parameter affecting the treatment of a textile is determined in step 101. The information item is thereby detected, for example, by an information carrier, for example, information carrier 211, 212, 213 of a package of a cleaning agent 210, and/or information carrier 221, 222, 223 of a textile 220, and/or information carrier 231, 233 of a cleaning device 230 according to FIG. 2a and/or 2b. The information carrier can be, for example, a package or the imprint on a package of a cleaning agent, a label or the imprint on a label, an NFC chip or a combination thereof.

For example, the determined information item is indicative of a composition of the cleaning agent, a shelf life of a cleaning agent, or a combination thereof. In particular, the determined information item is indicative of a composition of the cleaning agent and/or a shelf life of a cleaning agent for the case in which the information item is arranged and detected by an information carrier, for example, on the package of a cleaning agent, such as the package of the cleaning agent 210 according to FIG. 2a and/or 2b.

Furthermore, the determined information item can be indicative of a surface property of the textile. In particular, the determined information item can be indicative of a surface property of the textile when the information item is detected by an information carrier arranged on the textile, for example, information carriers 221, 222, 223 of the textile 220 according to FIG. 2a and/or 2b. In this case, the determined information item can be characteristic of a surface property, such as a type of textile material, a material structure of the textile, or a combination thereof.

Additionally or alternatively, the determined information item can for example, be indicative of a type of cleaning device, in particular when the determined information item is detected by an information carrier of a cleaning device, for example, cleaning device 230 according to FIG. 2a.

At least one treatment parameter of the textile is determined at least in part based on the determined information item in step 102. The at least one treatment parameter can be indicative of a recommendation or effect of a type of cleaning agent, cleaning temperature, duration of cleaning, dosing of cleaning agent, a time for using the cleaning agent, a cleaning program or a combination thereof. Affecting can be understood as meaning, for example, causing the performance of the treatment of a textile, wherein, for example, a cleaning device (for example, the cleaning device 230 according to FIG. 2a) selects the corresponding cleaning agent for the treatment of the textile on the basis of the at least one treatment parameter indicative of a type of cleaning agent. In this case, for example, the cleaning device can store one or more different types of cleaning agent, which can be used, for example, at least partially automatically for the treatment of the textile by the cleaning device. Accordingly, an effect can be performed based on the at least one treatment parameter of a cleaning device according to the cleaning temperature, duration of cleaning, dosage of cleaning agent, time of application of the cleaning agent or a cleaning program used for treating the textile or a sequence of several such cleaning programs.

The at least one determined treatment parameter is output in step 103. Alternatively or additionally, a triggering of an output of the at least one determined treatment parameter can take place. For example, the determined treatment parameter can be output on a display device, for example, display 243 of the device 240 according to FIG. 2a. For example, the output can be a recommendation to a user for treating the textile. For example, the user can be shown the material type of textile, a cleaning agent, and a cleaning program to be used for a cleaning device. Furthermore, the user can be presented with sets of treatment parameters for, for example, a pre-treatment, a cleaning treatment and a finishing treatment of the textile. The determination of the optimal treatment of the textile is thus facilitated or enabled for the user. For example, the user can then decide whether the treatment parameters should be adopted as recommended and perform a treatment. The at least one determined treatment parameter is determined optimized on the basis of the determined information item such that, in particular, resources in relation to the consumption of cleaning agent and/or the water consumption required in the treatment of the textile are conserved or their consumption is minimized.

The performance of the treatment of the textile is caused by employing a cleaning device, for example, cleaning device 230 according to FIG. 2a in step 104. For example, the at least one determined treatment parameter can be transmitted to the cleaning device via a communication system, so that the cleaning device selects, for example, a cleaning program, a type of cleaning agent to be used, and its dosage for the treatment of the textile according to the at least one determined treatment parameter, and cause the performance accordingly.

The treatment of the textile is performed according to the at least one treatment parameter in step 105.

FIG. 2a shows an embodiment of devices according to the second aspect and a system 200a according to the third aspect.

The system comprises a mobile device 240, for example, a smart phone, tablet, thin client or the like, in this case a smart phone, a communication system 250, a server 260, a database 270, and at least one package of a cleaning agent 210 comprising an information carrier, a textile 220 comprising an information carrier and/or a cleaning device 230 comprising an information carrier.

The package of the cleaning agent can comprise at least one information carrier, such as an imprint 211, a bar code 212, in the present case a bar code and/or an NFC chip 213.

The textile 220 can comprise at least one information carrier, such as a label 221 with an imprint or bar code, and/or an NFC chip 223. Alternatively or additionally, the label 221 can have an NFC chip. Furthermore, the textile itself can serve as an information carrier. In the present case, the reference numeral 222 schematically shows the structure based on a mesh shape of the textile 220. For example, by detecting the material structure, the information item indicative of a parameter affecting the treatment of a textile can be determined, wherein the determined information item in particular is indicative of at least one surface property of the textile 220. In this case, for example, a textile in the form of a garment can have a specific material structure, for example, the textile 220 includes, among other things, of a textile of wool, cotton or synthetic fibers. This surface property can be determined, for example, as information item.

The cleaning device 230 can comprise at least one information carrier in the form of an imprint 231, wherein the imprint 231 is characteristic, for example, of the type of the cleaning device 230. Furthermore, the cleaning device can, for example, comprise an NFC chip 233 as an information carrier.

For example, an information item of the cleaning agent 210, the textile 220 and/or the cleaning device 230 can be determined using the mobile device 240. An optical sensor element 241 and/or an NFC reading device 242 are provided for this purpose. The optical sensor element 241 is in particular an optical sensor or a camera-like element.

The optical sensor element 241 detects, for example, an image information item of the information carrier. Accordingly, the image information item of the information carrier can be provided by the camera-like member. The image information item can be processed to determine at least one treatment parameter, for example, by employing character recognition, such as OCR recognition. Further, a bar code, such as a bar code or a two-dimensional bar code can be imaged on the information carrier, for example. The camera-like element detects the bar code as an image information item, that is, the camera-like element provides the bar code as an image information item. The image information item can be processed by employing bar code recognition, so that an information item coded by employing the bar code can be determined.

An information item can be detected by an information carrier by the NFC reading device 242. For example, the information carrier 213 of the cleaning agent 210, the information carrier 221 with NFC chip of the textile 220 and/or the information carrier 233 of the cleaning device 230 can be detected with the NFC reader device.

The at least one determined treatment parameter is obtained, for example, on the part of the mobile device and/or on the part of the cleaning device 230 from a communication system 250 which communicates with the mobile device 240, the cleaning device 230 and/or the server 260. The server 260 communicating with the communication system 250 has a further communication connection to a database 270. The database can alternatively or additionally be implemented locally in the mobile device 240. In one embodiment, the server 260 is configured to communicate with the database 270 to determine at least one treatment parameter based at least in part on the determined information item. The server 260 and optionally the database 270 can additionally or alternatively be formed as a separate device or also be integrated, for example, in the mobile device 240 and/or the cleaning device 230.

If the determined information item represents, for example, a unique identifier, at least one treatment parameter can be determined by comparing the identifier with information items stored in the database 270.

The at least one treatment parameter is output, in particular on the display device 243 of the mobile device 240. The user can then select and perform a treatment according to the determined at least one treatment parameter. Additionally or alternatively, the at least one determined treatment parameter can be output to a cleaning device, for example, cleaning device 230. For example, the cleaning device 230 adopts a cleaning temperature and a cleaning program as a default setting based on the at least one treatment parameter obtained. To transmit or output the at least one treatment parameter to a device according to the second aspect, for example, the mobile device 240 and/or the cleaning device 230, the at least one treatment parameter can be transmitted to the device via the communication system 250. Furthermore, for example, a type of cleaning agent and a dosing of cleaning agent corresponding to the at least one treatment parameter can be automatically selected and used to treat the textile by employing a dosing device (not shown) of the cleaning device 230. The user then only has to start the treatment on the cleaning device 230, for example, via a control element, in order to perform an optimum cleaning of the textile. Alternatively, the treatment can be started via an input of the user at the device, for example, the mobile device 240, wherein a corresponding control information item is transmitted from the mobile device 240 to the cleaning device 230, for example, via the communication system 250. The treatment of the textile can be started on the cleaning device 230 without a separate action of the user on the basis of the control command.

Figure 2B:
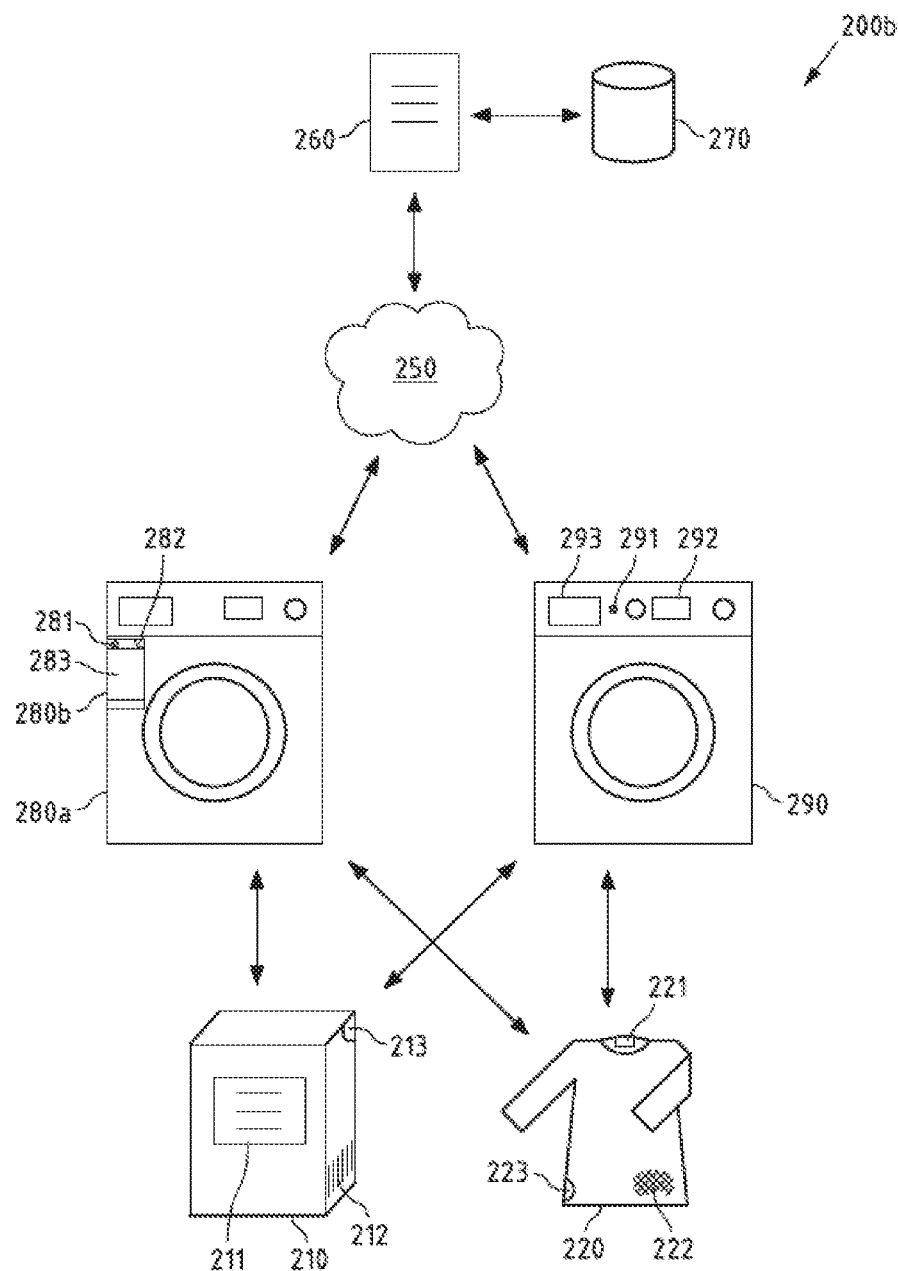
FIG. 2*b* is a schematic representation of a further embodiment of a system.

FIG. 2b shows an embodiment of devices according to the second aspect or a system 200b according to the third aspect.

In contrast to FIG. 2a, the system 200b comprises a module 280b which is arranged on a cleaning device 280a. For example, the cleaning device 280a can be retrofitted with the module 280b. Furthermore, the system 200b comprises a cleaning device 290 which is equipped with a similar module, that is, the module is integrated into the cleaning device 290. The module in each case comprises a camera-like element 281, 291 and an NFC reading device 282, 292. A display device 283, 293 in each case completes the module for performing the method, in particular according to the method claims. The module 280b or the module integrated into the cleaning device 290 is formed to perform a determination of an information item indicative of a parameter affecting the treatment of a textile. For this purpose, for example, by the camera-like element 281, 291, the information item can be detected by an information carrier, for example, information carrier 211, 212 of the cleaning agent 210, and/or information carrier 221, 222 of the textile 220, in particular in the manner described with reference to FIG. 2a.

The module 280b of the cleaning device 280a, like the module integrated into the cleaning device 290, has a communication connection to a communication system 250 comprised by the system 200b.

The communication system 250 communicates with the module 280b or the module integrated into the cleaning device 290 and/or the server 260. The server 260 communicating with the communication system 250 has a further communication connection to a database 270. The database can alternatively or additionally be implemented locally in the module 280b or in the module integrated into the cleaning device 290. In one embodiment, the server 260 is configured to communicate with the database 270 to determine at least one treatment parameter based at least in part on the determined information item, for example, in the nature of a cloud-based system. The server 260 and optionally the database 270 can additionally or alternatively be formed as a separate device or also be integrated, for example, into the mobile device 240 and/or the cleaning device 230.

Further embodiments which can be performed, for example, by devices according to the second aspect or by a system 200 according to the third aspect are listed in the following:

The following table gives an exemplary overview of a type of information carrier by which at least information item is detected, which information item is determined by the information carrier, and which at least one treatment parameter is determined based on the determined information item. Subsequently, individual embodiments provided with a number of 1 to 5 in the table below are exemplified.

| Embodiment number | Information carrier of | Certain information item | Determined treatment parameters |
|---|---|---|---|
| 1 | a package of a cleaning agent | composition of the cleaning agent; (forecast of) cleaning agent activity (date of manufacture, age) | recommendation on or effect of the cleaning agent dosage (for example, quantity, time of application) and/or the cleaning program (for example, temperature, duration) |
| 2 | a package of a cleaning agent and a cleaning device | composition of the cleaning agent; (forecast of) cleaning agent activity (date of manufacture, age); type of cleaning device | recommendation on or effect of the cleaning agent dosage (for example, quantity, time of application) and/or the cleaning program (for example, temperature, duration) |
| 3 | a package of a cleaning agent and a textile | composition of the cleaning agent; (forecast of) cleaning agent activity (date of manufacture, age); type (for example, surface property) of the textile | recommendation on or effect of the cleaning agent dosage (for example, quantity, time of application) and/or the cleaning program (for example, temperature, duration) |
| 4 | a cleaning device and a textile | type of cleaning device; type (for example, surface property) of the textile | recommendation on or effect of the type of cleaning agent (for example, quantity, time of application) and/or the cleaning program (for example, temperature, duration) |
| 5 | a textile | care instructions of the textile | recommendation on or effect of the cleaning agent dosage (for example, quantity, time of application) and/or the cleaning program (for example, temperature, duration) |

Embodiment 1

In one exemplary embodiment, for example, according to a third aspect, a mobile device, for example, the smart phone 240 according to FIG. 2a, or a module comprised by a cleaning device, for example, module 280b according to FIG. 2b or the module integrated into the cleaning device 290 according to FIG. 2b, has a computer program for determining an information item using a built-in camera-like element and optionally other sensors. The computer program comprises a module for recognizing characters, a so-called OCR module, by which an image information item can be used to obtain a digital representation of written information item. With the aid of the camera-like element, for example, a photograph of a package of a cleaning agent, for example, cleaning agent 210 according to FIG. 2a or FIG. 2b, can be taken in detail from the content description as an information carrier, for example, information carrier 211 according to FIG. 2a or FIG. 2b. This detected image information item can be converted into a digital representation. In detail, for example, the durability and the composition of the cleaning agent are read from the image information item, which can be used for further indication. The computer program can further have a logic or, alternatively, allow access to a database, for example, database 270 according to FIG. 2a or 2b. On the basis of the indication, a further action can be output in accordance with a determined treatment parameter, such as a recommendation for the amount of cleaning agent to be supplied. The time of addition of the cleaning agent or a combination thereof are affected in the performance on the part of a module of a cleaning device, for example, module 280b or the module integrated into the cleaning device 290 according to FIG. 2b, for example, in addition to the selection and addition of a amount of cleaning agent based on the determined treatment parameter, the temperature, the choice of cleaning program. The effect can be output, for example, via a display device integrated into the module of the cleaning device or into the cleaning device, for example, display device 283, 293 according to FIG. 2b. Alternatively or additionally, the cleaning device, for example, via a circuit communicating with the module LEDs, can display the amount of cleaning agent to be supplied.

A further embodiment provides that the mobile device or a module comprised by a cleaning device has a computer program which supports detection of an information item by NFC. For example, an information item about the durability and the composition of the cleaning agent can be stored in the form of an NFC chip, for example, NFC chip 213 according to FIG. 2a and/or 2b, and correspondingly, for example, can be transmitted by employing a wireless transmission to the mobile device or the module comprised by a cleaning device. The mobile device or module comprised by a cleaning device can have an NFC reader, for example, NFC reader 242 according to FIG. 2a or 282, 292 according to FIG. 2b. The computer program can further have a logic or, alternatively, allow access to a database, for example, database 270 according to FIG. 2a or 2b. On the basis of the indication, a further action can be output in accordance with a determined treatment parameter, such as an ideal and individual recommendation of a cleaning program.

In a further embodiment, the mobile device or the module comprised by a cleaning device has a computer program which supports determining at least one information item with the aid of a camera-like element and optionally further sensors. The computer program comprises, for example, a module for detecting a bar code. The bar code can, for example, represent an information item regarding a composition of a cleaning agent and/or a durability of the cleaning agent. Alternatively, the mobile device or module comprised by a cleaning device can have a wireless connection to a communication system, such as the Internet. For example, the bar code can represent a product code so that an information item regarding a composition of a cleaning agent and/or a durability of the cleaning agent can be downloaded via the product code over the Internet. At least one treatment parameter can be determined in order, for example, to set a further action on the basis of the at least one treatment parameter by employing integrated logic and/or with the aid of a database, for example, database 270 according to FIG. 2.

Embodiment 2

In one embodiment, for example, according to a third aspect, a mobile device, for example, the smart phone 240 according to FIG. 2*a* or a tablet, has a computer program. A package of a cleaning agent, for example, cleaning agent 210 according to FIG. 2*a*, is detected according to at least the options already explained above according to OCR, NFC or bar code. In addition, the type of cleaning device is determined by employing an NFC chip integrated into a cleaning device, for example, NFC chip 233 according to FIG. 2*a* and an NFC reading device, for example, NFC reading device 242 according to FIG. 2*a*. The computer program, executed and/or controlled, for example, on the mobile device 240, comprises a logic via a predetermined database, for example, in order to determine at least one treatment parameter using the previously determined information item on the cleaning agent and the information item on the type of cleaning device. For example, according to the determined treatment parameter, a recommendation can be made to a user regarding the duration and type of cleaning program of the cleaning device to be selected, for example, by outputting the at least one treatment parameter on a display device of the mobile device.

A further exemplary embodiment provides that the mobile device has a computer program by which and by employing a camera-like element comprised by the mobile device, an information item indicative of at least one parameter affecting the treatment of a textile is determined. The computer program comprises, for example, a module for recognizing characters, an OCR module, with which a digital representation of character-based information items can be obtained from a detected image information item. With the aid of the camera-like element, for example, a photo of a cleaning device can be taken in detail, for example, of the nameplate (for example, make and model) attached to the cleaning device, for example, information carrier 231 according to FIG. 2*a*. This detected image information item can be converted into a digital representation. From the type of determined information item embodied as in any of the above embodiments, which information item is detected by an information carrier, and the further determined information item about the type of the cleaning device, at least one treatment parameter is determined via a logic integrated into the computer program or a predefined database, for example database 270 according to FIG. 2*a*. For example, a recommendation to a user regarding the amount of a cleaning agent to be supplied can be output based on the determined treatment parameter.

Embodiment 3

In one exemplary embodiment, for example, according to a third aspect, a mobile device, for example, the smart phone 240 according to FIG. 2*a*, or a module comprised by a cleaning device, for example, module 280*b* according to FIG. 2*b* or the module integrated into the cleaning device 290 according to FIG. 2*b*, has a computer program, by which, and a module comprised by the mobile device or by the cleaning device, an information item indicative of at least one parameter affecting the treatment of a textile is determined. A package of a cleaning agent, for example, cleaning agent 210 according to FIG. 2*a* or FIG. 2*b*, is detected according to at least the options already explained above according to OCR, NFC or bar code. The computer program comprises, for example, a module for analyzing texture and color of a textile from an image information item which can be detected using the camera-like element. An estimate of the color and/or of a surface property of the textile can be obtained from the image information item. From the determination of an information item as stated above, which information item is detected by an information carrier of a package of a cleaning agent, and the information item detected from the textile, at least one treatment parameter is determined via a logic integrated into the computer program or a predefined database, for example database 270 according to FIG. 2*a* or FIG. 2*b*. For example, a recommendation to a user regarding the amount of a cleaning agent to be supplied can be output based on the determined treatment parameter. Alternatively or additionally, the cleaning device, for example, via a circuit communicating with the module LEDs, indicate the amount of cleaning agent to be supplied.

In a further embodiment according to the above embodiment 3, however, without logic integrated into the computer program or a predefined database in the mobile device, by employing a determined information item representing a product code, for example, the determination of the at least one treatment parameter takes place via downloading of these information items, for example from the Internet, on the basis of the information representing the product code.

According to a further embodiment, a mobile device, for example, the smart phone 240 according to FIG. 2*a*, or a module comprised by a cleaning device, for example, module 280*b* according to FIG. 2*b* or the module integrated into cleaning device 290 according to FIG. 2*b*, has a computer program which supports determining an information item with the aid of a built-in camera-like element, a built-in NFC reading device and optionally other sensors. The computer program has one of the above-described modules for determining an information item by reading out an NFC chip, an OCR recognition and/or a reading of a bar code. Furthermore, the computer program can comprise a module for determining an information item about, for example, texture and/or color of a textile, wherein the information item can be determined by an NFC chip of the textile. For this purpose, for example, an NFC chip can be integrated into a respective textile, which chip can be read, for example, by employing an NFC reading device, such as NFC reading device 242 according to FIG. 2*a*, of the mobile device 240. If, furthermore, an information item is detected by an information carrier of a cleaning agent, at least one treatment parameter can be determined from the determined information item of the cleaning agent and the determined information item of the textile. The determined treatment parameter can be, for example, indicative of a recommendation to a user and/or an effect of the cleaning device by the module with regard to the duration and type of cleaning program of a cleaning device to be selected or performed. Accordingly, the cleaning device can, for example, cause an automatic adjustment of the cleaning temperature and/or cleaning program on the basis of the determined treatment parameter.

According to a further embodiment, a mobile device, for example, the smart phone 240 according to FIG. 2a, or a module comprised by a cleaning device, for example, module 280b according to FIG. 2b or the module integrated into cleaning device 290 according to FIG. 2b, has a computer program which supports determining an information item with the aid of a built-in camera-like element, a built-in NFC reading device and optionally other sensors. The computer program has one of the above-described modules for determining an information item by reading out an NFC chip, an OCR recognition and/or a reading of a bar code. For example, a photo can be detected, which is present as an image information item in a digital representation by the camera-like element. In detail, the detected image information item can in particular comprise a digital representation of a label of a textile. From the detected image information item of the label, for example, a care instruction of the textile can be obtained, for example, in which the image information item is processed by employing an OCR recognition. The computer program has, for example, a logic or a predefined database, which is comprised, for example, by the mobile device in order to determine at least one treatment parameter based on the determined information item. By way of example, the determined treatment parameter can be, for example, indicative of a recommendation for the amount of cleaning agent to be supplied, a dosage of cleaning agent.

Embodiment 4

In one embodiment, for example, according to a third aspect, a mobile device, for example, the smart phone 240 according to FIG. 2a, has a computer program which supports determination of an information item with the aid of a built-in camera-like element and optionally further sensors. The computer program has one of the above-described modules for determining an information item by reading out an NFC chip, an OCR recognition and/or a reading of a bar code. An information item is determined by an information carrier of a textile, for example, by an NFC chip 223. Alternatively or additionally, an image information item can be provided by the textile by the camera-like element. The information item thus determined can, for example, be indicative of a surface property of the textile. At least one treatment parameter can be determined, for example, by the computer program from the sum of the determined information items from the textile and, for example, from a cleaning device. For this purpose, for example, a logic or database comprised by the computer program based on the at least one determined treatment parameter can be used to output or trigger the outputting of the at least one treatment parameter. The at least one treatment parameter in this case can be indicative of a recommendation to a user regarding the duration of cleaning and the cleaning program, for example.

Embodiment 5

According to an embodiment, for example, according to a third aspect, a mobile device, for example, the smart phone 240 according to FIG. 2a, or a module comprised by a cleaning device, for example, module 280b according to FIG. 2b or the module integrated into the cleaning device 290 according to FIG. 2b, has a computer program which supports determining an information item with the aid of a built-in camera-like element and optionally further sensors. The computer program comprises, for example, a module for analyzing texture and color of a textile from an image information item which can be detected using the camera-like element. An estimate of the color and/or of a surface property of the textile can be obtained from the image information item. The computer program can, for example, by employing a communication interface of the mobile device or by employing a communication interface of the module comprised by the cleaning device, via a communication system, for example, communication system 250 according to FIG. 2a or FIG. 2b, create a communication connection to a cloud, for example, provided by a server and a database (for example, server 260 and database 270 according to FIG. 2a or 2b). One or more further information items indicative of care instructions of the textile and/or other properties of the textile can thus be determined. At least one treatment parameter can be determined on the basis of at least these determined information items. An action can be derived from the determined treatment parameter. By way of example, for example, the determined treatment parameter can be indicative of a recommendation of a cleaning agent dosage. Furthermore, an effect can be output, for example, via a display device integrated into the module of the cleaning device or integrated into the cleaning device, for example, display device 283, 293 according to FIG. 2b. Alternatively or additionally, the cleaning device, for example, via a circuit communicating with the module light emitting diodes, can display the amount of cleaning agent to be supplied.

A user can then, for example, manually supply the appropriate amount of cleaning agent on the basis of this display of the dosage of cleaning agent by the light-emitting diodes.

According to a further embodiment, the information item is determined by an information carrier of a textile, wherein the information carrier comprises an NFC chip. For this purpose, at least one NFC reading device is used to determine the information item. The information item thus determined can be indicative of at least one care instruction of the textile. At least one treatment parameter can be determined via a logic of the device integrated into a computer program, for example, the mobile device 240 according to FIG. 2a or the module 280b of the cleaning device 280a according to FIG. 2b or the module integrated into the cleaning device 290 according to FIG. 2b, or a predefined database which, for example, can be comprised by the device, or can be queried in the manner of a cloud by the device via a communication system (for example, communication system 250 according to FIG. 2a or FIG. 2b). The determined treatment parameter can be indicative of a recommendation of a cleaning agent dosage in this case, for example.

A further embodiment provides for a mobile device, for example, the smart phone 240 according to FIG. 2a, or a module comprised by cleaning device, for example, module 280b according to FIG. 2b or the module integrated into cleaning device 290 according to FIG. 2b, has a computer program which supports a determination of an information item. The computer program comprises a so-called template matching algorithm, in particular in order to transfer a symbol printed on a label of a textile into a digital form. An information item can be determined, for example, indicative of a surface property of the textile according to the symbol by employing an internal logic of the computer program or by employing a predetermined database. To make the determination, for example, the digital form of the symbol can be adjusted by segmentation and a normalized cross correlation (NCC).

An example of segmentation is taking a photo of the label, and then using, for example, Maximally Stable Extremal Regions (MSER). In this case, an image is processed so that dark is distinguished from light regions and light from dark regions. Assuming the label is black, the imprint will be bright and vice versa. The algorithm makes it possible to find the regions. This is a type of segmentation wherein a particular segment or particular part of an image is identified or, more generally, an image is divided into parts. At least one treatment parameter of the textile is determined based at least in part on the determined information item. The at least one treatment parameter can, for example, be indicative of a recommendation to a user of a cleaning duration, and of a cleaning program or type of cleaning program to be selected.

NCC means applying a 2D function to the pixel values of an image. If the function is considered at the mathematical level, the function gives a quasi-value of 1 when a perfect match is found, and a value of −1 when there is a completely complementary comparison amount (that is, 1 when there is a white logo on a black background in the image, and the same in the database, and −1 when black logo on a white background, but white logo on a black background in the database). In practice, there are never any values of 1 or −1 due to image disturbances. Depending on the current comparison, values beyond +0.9 or −0.9 are usually an indication for the presence of a symbol.

Figure 3:
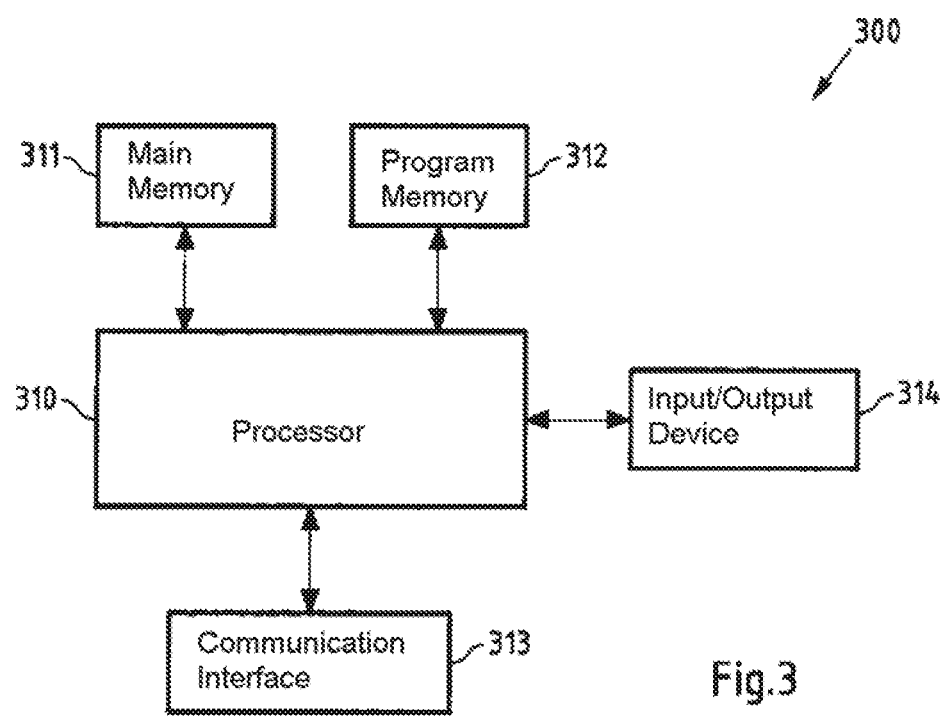
FIG. 3 is a block diagram of an embodiment of a device.

FIG. 3 shows a block diagram of an embodiment of a device 300, which, in particular, can execute an exemplary method according to the first aspect. The device 300 is, for example, a device according to the second aspect or a system according to the third aspect.

The device 300 can be, for example, a computer, a desktop computer, a server, a thin client, or a portable computer (mobile device), such as a laptop computer, a tablet computer, a personal digital assistant (PDA), or a smart phone. For example, the device can fulfill the function of a server or a client. The device 300 can furthermore be arranged on a cleaning device, wherein, for example, the device 300 can be arranged on a cleaning device such that a control or regulation of functions of the cleaning device is possible using the device 300. For this purpose, the device 300 can be connected to a control unit of the cleaning device, for example, via a wired and/or wireless communication connection.

Processor 310 of device 300 is particularly formed as a microprocessor, microcontrol unit, microcontroller, digital signal processor (DSP), application specific integrated circuit (ASIC) or field programmable gate array (FPGA).

Processor 310 executes program instructions stored in program memory 312 and, for example, stores intermediate results or the like in working or main memory 311. For example, program memory 312 is a nonvolatile memory such as a flash memory, a magnetic memory, an EEPROM memory (electrically erasable programmable read only memory), and/or an optical memory. Main memory 311 is, for example, a volatile or non-volatile memory, in particular, a random access memory (RAM) such as a static RAM (SRAM), a dynamic RAM (DRAM), a ferroelectric RAM (FeRAM) and/or a magnetic RAM memory (MRAM).

Program memory 312 is preferably a local data carrier permanently attached to device 300. Data carriers permanently connected to the device 300 are, for example, hard disks which are built into the device 300. Alternatively, the data carrier may, for example, also be a data carrier which can be connected in separable manner to the device 300, such as a memory stick, a removable data carrier, a portable hard disk, a CD, a DVD and/or a diskette.

Program memory 312 contains, for example, the operating system of device 300, which is at least partially loaded into main memory 311 and executed by processor 310 when device 300 is started. In particular, when device 300 starts, at least a part of the kernel of the operating system is loaded into main memory 311 and executed by processor 310. The operating system of device 300 is, for example, a Windows, UNIX, Linux, Android, Apple iOS, and/or MAC operating system.

In particular, the operating system enables the use of the device 300 for data processing. It manages, for example, resources such as main memory 311 and program memory 312, network or communication interface 313, input and output device 314, provides basic functions, among other things through programming interfaces, to other programs and controls the execution of programs.

Processor 310 controls communication interface 313, which can be, for example, a network interface and can be in the form of a network card, network module and/or modem. The communication interface 313 is, in particular, configured to establish a connection of the device 300 to other devices, in particular, via a (wireless) communication system, for example, a network, and to communicate with them. The communication interface 313 can, for example, receive data (via the communication system) and forward it to processor 310 and/or receive and send data (via the communication system) from processor 310. Examples of a communication system are a local area network (LAN), a wide area network (WAN), a wireless network (for example, according to the IEEE 802.11 standard, the Bluetooth (LE) standard and/or the NFC standard), a wired network, a mobile network, a telephone network and/or the Internet.

Furthermore, processor 310 can control at least one input/output device 314. Input/output device 314 is, for example, a keyboard, a mouse, a display unit, a microphone, a touch-sensitive display unit, a loudspeaker, a reading device, a drive and/or a camera. For example, input/output device 314 can receive inputs from a user and forward them to processor 310 and/or receive and output information to the user of processor 310.

The exemplary embodiments of the present disclosure described in this specification and the respective optional features and properties cited in this context should also be understood to be disclosed in all combinations with one another. In particular, the description of a feature encompassed by an exemplary embodiment is, unless explicitly explained to the contrary, not to be understood in this case as meaning that the feature is essential or fundamental for the function of the embodiment. The sequence of the method steps described in this specification in the individual flowcharts is not mandatory, alternative sequences of the method steps are conceivable. The method steps can be implemented in various ways, so that an implementation in software (by program instructions), hardware, or a combination of both to implement the method steps is conceivable.

Terms used in the patent claims, such as "comprising", "having", "including", "containing" and the like, do not exclude further elements or steps. The phrase "at least partially" includes both the "partial" and "completely" cases. The phrase "and/or" is to be understood as meaning that both the alternative and the combination is intended to be disclosed, that is, "A and/or B" means "(A) or (B) or (A and B)". The use of the indefinite article does not exclude a plurality. A single device can execute the functions of a plurality of units or devices mentioned in the patent claims. Reference numerals indicated in the claims are not to be regarded as limitations on the means and steps used.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the various embodiments in any way. Rather, the foregoing detailed description will provide those skilled in the art with a convenient road map for implementing an exemplary embodiment as contemplated herein. It being understood that various changes may be made in the function and arrangement of elements described in an exemplary embodiment without departing from the scope of the various embodiments as set forth in the appended claims.

The invention claimed is:

1. A method performed by a mobile computing device, comprising:
   determining, by the mobile computing device, a first information item indicative of at least one parameter affecting a treatment of a textile, wherein the first information item is detected in response to an information carrier of the textile and wherein the information carrier of the textile comprises a package, a label, an NFC chip, or a combination thereof, the mobile computing device is further configured to determine a third information item indicative of at least one of a composition of a cleaning agent and a shelf life of the cleaning agent;
   determining, by the mobile computing device, a second information item indicative of a cleaning device,
   determining, by the mobile computing device, a treatment parameter of the textile in response to the first information item, the third information item and the second information item; and
   displaying the treatment parameter on a display of the mobile computing device, wherein the treatment parameter is indicative of a setting of the cleaning device including at least one of a cleaning temperature, a duration of cleaning, a dosage of a cleaning agent and a cleaning program.

2. The method according to claim 1, wherein the mobile computing device includes an NFC reading device used to determine the first information item and the second information item.

3. The method according to claim 1, wherein the mobile computing device includes a camera configured to capture a first image of the information carrier of the textile and a second image of a nameplate of the cleaning device and wherein the first information item is determined in response to the first image and the second information item is determined in response to the second image.

4. The method according to claim 3, wherein for determining the treatment parameter of the textile, the image information item is processed by character recognition.

5. The method according to claim 3, wherein for determining the treatment parameter of the textile, the image information item is processed by a bar code recognition.

6. The method according to claim 2, wherein the NFC reading device is operated according to an NFC standard.

7. The method according to claim 1, wherein the mobile computing device is further configured to communicate the first information item, the second information item and the third information item to a server via a communications network and to receive the treatment parameter from the server via the communications network.

8. The method according to claim 1, wherein the first information item is indicative of at least one surface property of the textile.

9. The method according to claim 1, wherein the second information item is indicative of a type of the cleaning device.

10. The method according to claim 1, wherein the treatment parameter is indicative of a recommendation of at least one of a type of cleaning agent a time to use the cleaning agent, or a combination thereof.

11. The method according to claim 1, further comprising:
   initiating a performance of the treatment of the textile corresponding to the treatment parameter by the cleaning device.

12. The method according to claim 1, wherein the mobile computing device is a smart phone.

13. A device configured to perform and/or to control the method according to claim 1.

14. A system comprising:
   a plurality of devices including the mobile computing device and the cleaning device, which together perform the method according to claim 1.

15. The method according to claim 1 when the mobile computing device is configured to perform a template matching algorithm, to detect a symbol printed on the label of the textile to generate the second information item.

* * * * *